United States Patent
Da Silva Ferreira et al.

(10) Patent No.: US 12,001,008 B2
(45) Date of Patent: Jun. 4, 2024

(54) FAST TEMPERATURE TUNING FOR OPTICAL RECEIVERS

(71) Applicant: PICADVANCED S.A., Ilhavo (PT)

(72) Inventors: Ricardo Manuel Da Silva Ferreira, Aveiro (PT); Francisco Manuel Ruivo Rodrigues, Guarda (PT); José Miguel Laranjeira Lima, Campia (PT)

(73) Assignee: PICADVANCED S.A., Ilhavo (PT)

( * ) Notice: Subject to any disclaimer, the term of this patent is extended or adjusted under 35 U.S.C. 154(b) by 540 days.

(21) Appl. No.: 17/430,587

(22) PCT Filed: Feb. 6, 2020

(86) PCT No.: PCT/IB2020/050953
§ 371 (c)(1),
(2) Date: Aug. 12, 2021

(87) PCT Pub. No.: WO2020/170062
PCT Pub. Date: Aug. 27, 2020

(65) Prior Publication Data
US 2022/0128792 A1 Apr. 28, 2022

(30) Foreign Application Priority Data
Feb. 22, 2019 (PT) .......................... 115327

(51) Int. Cl.
*G02B 26/00* (2006.01)
*H04B 10/67* (2013.01)

(52) U.S. Cl.
CPC ......... *G02B 26/001* (2013.01); *H04B 10/671* (2013.01)

(58) Field of Classification Search
None
See application file for complete search history.

(56) References Cited

U.S. PATENT DOCUMENTS

| | | |
|---|---|---|
| 6,667,998 B1 | 12/2003 | Lo et al. |
| 2007/0230866 A1* | 10/2007 | Daiber ............... G02B 6/29394 385/24 |
| 2008/0159340 A1 | 7/2008 | Daiber et al. |
| 2014/0099105 A1* | 4/2014 | Yan .................. H04B 10/07955 398/38 |
| 2018/0337512 A1 | 11/2018 | Tian et al. |

(Continued)

FOREIGN PATENT DOCUMENTS

WO WO-2007134076 A2 * 11/2007 ........... H04B 10/673

OTHER PUBLICATIONS

International Search Report for International Application No. PCT/IB2020/050953, mailed May 20, 2020, 3pp.

(Continued)

*Primary Examiner* — Rodney E Fuller
(74) *Attorney, Agent, or Firm* — The Roy Gross Law Firm, LLC; Roy Gross

(57) ABSTRACT

A new and improved tunable optical receiver based on thermal optics and controllers for technologies that require fast wavelength channel tuning. The device entails a thermal control system in which a wavelength tunable filter, a sensor and at least two thermal actuators enables fast tuning, which are controlled by advanced algorithms. The key compositions of both parts are outlined and their main requirements are discussed.

18 Claims, 2 Drawing Sheets

(56) References Cited

U.S. PATENT DOCUMENTS

2018/0337736 A1* 11/2018 Tian ..................... H01L 25/167

OTHER PUBLICATIONS

Written Opinion for International Application No. PCT/IB2020/050953, mailed May 20, 2020, 6pp.
International Preliminary Report on Patentability for International Application No. PCT/IB2020/050953, completed Feb. 12, 2021, 30pp.

* cited by examiner

[Fig. 1]
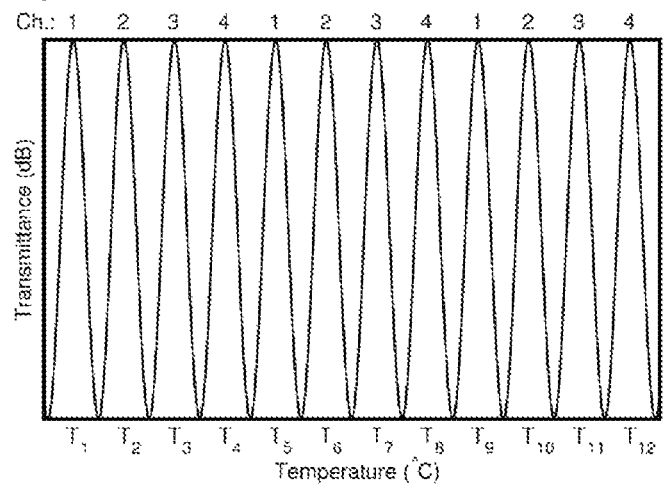
[Fig. 2]
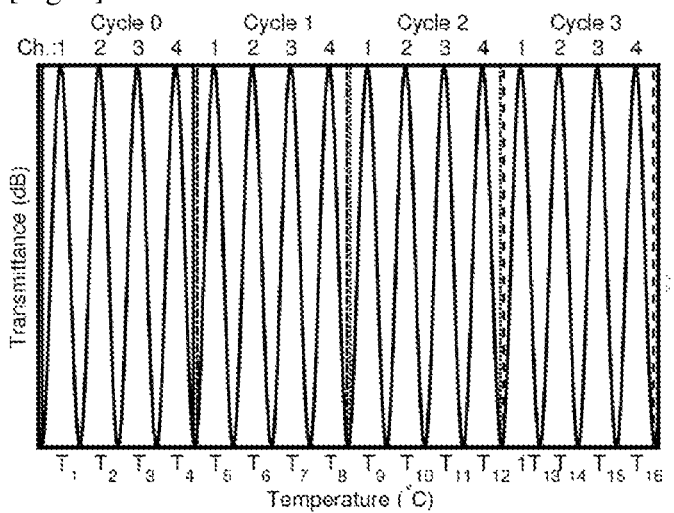
[Fig. 3]
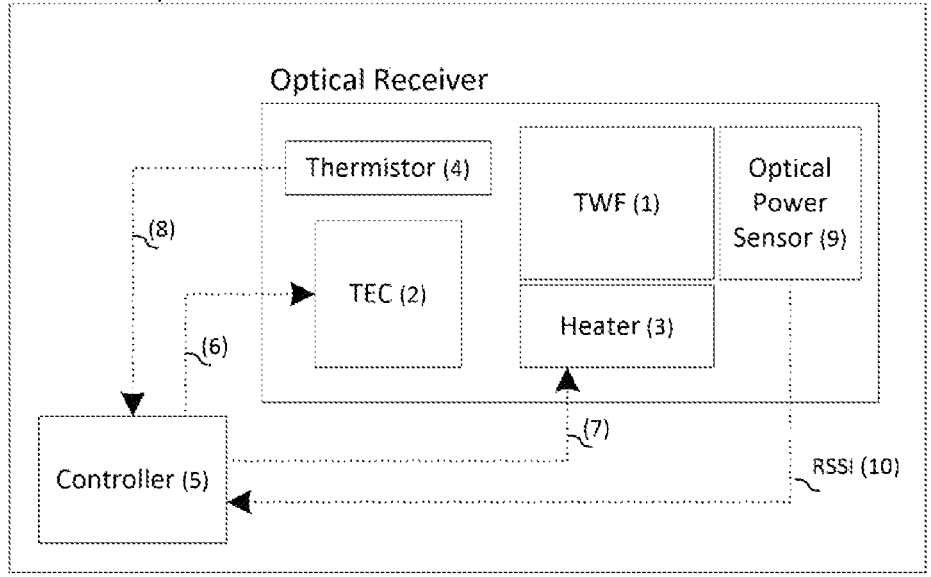

[Fig. 4]
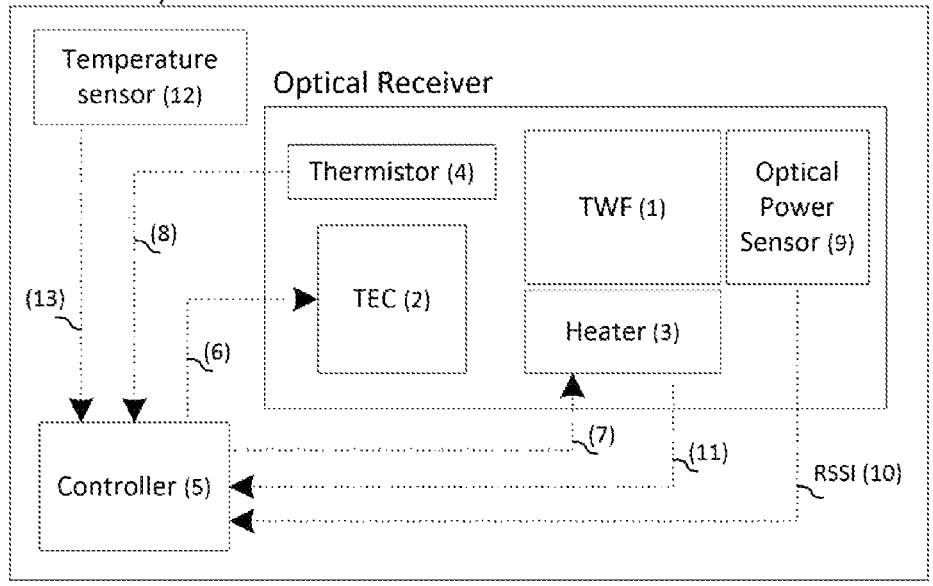
[Fig. 5]
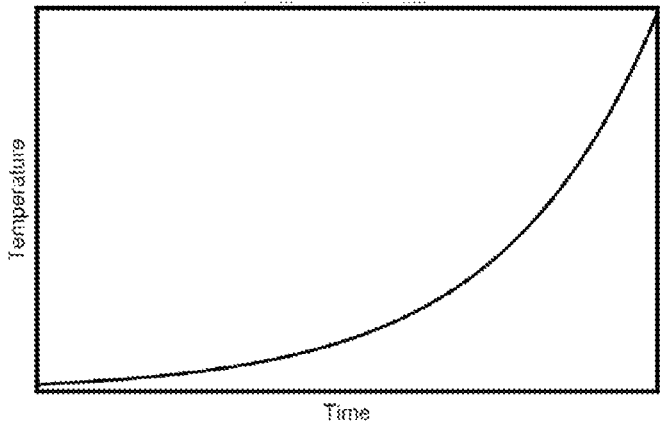
[Fig. 6]
| Source | | | Target | | | | | | |
|---|---|---|---|---|---|---|---|---|---|
| | | | T11 | T12 | T13 | T14 | T15 | T16 | T17 |
| | | | Cycle 2 | | Cycle 3 | | | | Cycle 4 |
| | | | CH 3 | CH 4 | CH 1 | CH 2 | CH 3 | CH 4 | CH 1 |
| T11 | Cycle 2 | CH 3 | - | V | V | V | - | - | - |
| T12 | | CH 4 | V | - | V | V | - | - | - |
| T13 | Cycle 3 | CH 1 | - | V | - | V | V | - | - |
| T14 | | CH 2 | - | - | V | - | V | V | - |
| T15 | | CH 3 | - | - | V | V | - | V | - |
| T16 | | CH 4 | - | - | - | V | V | - | V |
| T17 | Cycle 4 | CH 1 | - | - | - | V | V | V | - |

FAST TEMPERATURE TUNING FOR OPTICAL RECEIVERS

CROSS REFERENCE TO RELATED APPLICATIONS

This application is a National Phase of PCT Patent Application No. PCT/IB2020/050953 having International filing date of Feb. 6, 2020, which claims the benefit of priority of Portugal Patent Application No. 115327, filed Feb. 22, 2019, the contents of which are all incorporated herein by reference in their entirety.

TECHNICAL FIELD

The present invention relates to fast temperature tuning in tunable optical receivers, wherein tunable optics are used to receive different wavelength channels. More precisely, exemplary embodiments of the present invention relate to a next generation passive optical network phase 2 (NG-PON2) optical network unit (ONU) transceiver with integrated wavelength-tunable optics controlled by a control mechanism which can be a controller.

BACKGROUND ART

Tunable optical receivers are used to select a specified wavelength channel by using an optical filter. NG-PON2 is an example of a technology that requires tunable optical receivers, since the main feature that distinguishes this technology from the existing passive optical networks (PON) standards is the requirement of the industry's first PON standard that supports multiple wavelengths and being compatible with power-splitter-based optical distribution networks (ODNs).

Two technologies are consented in NG-PON2 standards: a hybrid time and wavelength division multiplexing (TWDM) PON and a wavelength overlay point-to-point WDM (PtP WDM) PON. Due to the NG-PON2 system multi-wavelength capability, both TWDM and PtP WDM can employ more than one wavelength channel so as to increase the total system capacity. Consequently, ONUs with the ability of tuning to a specific wavelength channel, both in the downstream (DS) and upstream (US) directions, are essential to facilitate colorless operation. It is noteworthy that, the wavelength tunability of the ONU transmitter and receiver is a novel feature that does not exist in the earlier generations of PON standards as described, e.g. on G.989.2 "40-Gigabit-capable passive optical networks 2 (NG-PON2): Physical media dependent (PMD) layer specification", technical report, ITU-T, Amendment 2, September 2017. Hence, from the optical line terminal (OLT) to the ONU, defined as DS direction, a tunable ONU receiver is essential for selecting proper wavelength channel from the available channels from the OLT (four or eight channels are defined in the standard for NG PON2). Similarly, from the ONU up to OLT, so called the US direction, the ONU transmitter needs to be tuned in order to emit at the required wavelength channel.

The minimum aggregate capacity supported by the TWDM-based NG-PON2 systems are 40 Gb/s in the DS and 10 Gb/s in the US directions. Based on the per-wavelength channel perception, TWDM presents three DS/US line rate combinations: the 10/2.5 Gb/s base case and optional symmetric rates of 10/10 and 2.5/2.5 Gb/s. Also, for PtP WDM, three-line rate classes (around 1, 2.5, and 10 Gb/s) are specified for transport of SDH/OTN, Ethernet, and CPRI services.

As a result of the fundamental requisite for compatibility with power-splitter-based ODNs, it is known that the NG-PON2 system demands wavelength-tunable optics in the transmitter as well as receiver of the ONU transceiver. The tuning time is a special attribute of the tunable device in an NG-PON2 ONU transceiver, being the elapsed time from the instant the tunable device leaves the source wavelength channel up to the moment it reaches stably the target wavelength channel for both transmitter and receiver. The physical media dependent layer recommendation (ITU-T G.989.2) states three tuning time classes for the NG-PON2 technology, for instance. And these classes were broadly defined based on known wavelength tunable technologies:

Class 3: This is the slowest (25 ms to 1 s) class and the tunable devices can be easily based on thermal effects for the variation of their operating wavelength. This class is suitable for applications with infrequent tuning operations. It is also applicable in systems wherein a short service interruption is tolerable.

Class 2: This tunable device class permits faster channel tuning time (10 µs to 25 ms) allowing sub-50 ms protection. Furthermore, Class 2 devices facilitate dynamic load-sharing as well as dynamic power-saving features.

Class 1: This tunable device class is categorized by low tuning times (<10 µs). These could facilitate a future dynamic wavelength and bandwidth allocation feature in the system. Furthermore, the OLT may dynamically control not only the transmission time and duration but also the transmission wavelengths of ONUs. This will enable wavelength hopping between the transmission periods.

These classes demand the combination of wavelength switching and OLT service restoration to be within the stipulated time. The existing NG-PON2 technology focus is Class 3 and Class 2, as described by Ronald Heron, Joe Smith, and David Thomas in "Wavelength Mobility opens paths to efficiency", technical report, Nokia, February 2017. However, the present-day deployment entails Class 3 only, and for some more demanding applications and services it is necessary to develop low-cost commercial Class 2 solutions. And with an implementation using only, for instance, a thermal-based wavelength controller for the transmitter or the receiver, such as a thermoelectric cooler (TEC) device, it is highly challenging to ensure the entire operating temperature range of the optical transceiver (C-temp range from 0 to 70° C. or I-temp range from −40 to 85° C., for instance), as well as ensuring a tuning time compatible with Class 1 or Class 2 mode operation.

Therefore, it is an object of this invention to provide a tunable optical receiver with fast wavelength channel tuning using an implementation based on thermal optics and controllers. The exemplary embodiments focus on the Class 2 mode of the NG-PON2 ONU receiver. It is a further object of the present invention to provide a precise wavelength channel calibration and operation when these tunable optical receivers are employed

SUMMARY OF INVENTION

Embodiments disclosed herein relate to an NG-PON2 ONU receiver capable of operating in Class 2 mode, as an example of a technology that uses tunable optical receivers enabling fast wavelength channel tuning.

The exemplary embodiment for the receiver side of the NG-PON2 ONU comprises of a tunable wavelength filter (TWF), a thermal actuator that can be a TEC, and a thermistor, which are enclosed in module controlled by a controller. The TWF may be, for instance, a thin-film optical filter. The TEC actuator is generally thermally coupled to the TWF to control the center wavelength of the receiver filter, i.e. a specific temperature provided by the TEC to the TWF results in a specific filtered optical wavelength.

The TEC, the thermistor and the controller are used for temperature control. The thermistor's resistance changes proportionally to the temperature, it is employed as a voltage divider and converts temperature into voltage. This feedback voltage is then used as reference for the control system in order to level the TEC actuator towards achieving the desired and required TWF temperature, i.e. the desired center wavelength of the receiver filter.

In general, TEC controllers are employed for thermoelectric cooling as well as heating in combination with Peltier elements being the latter heat pumps that transfer heat from one side to the other, depending on the applied direction of electrical current. The TEC controllers are utilized to drive the Peltier elements and a controller may be used to monitor and control the thermal loop.

To accomplish a tuning time compatible with Class 2 mode operation of the NG-PON2 ONU, besides the traditional TEC controller, the present invention comprises an additional thermal actuator (e.g. heater device) that is thermally coupled to the TWF. This additional actuator is used to effectively control the temperature of the TWF over a wide range of temperatures

BRIEF DESCRIPTION OF DRAWINGS

Schematic diagrams are not drawn to scale and specific details of typical components may not be shown in the interest of succinctness. Consequently, the present arrangement and figures are to be considered as descriptive rather than restrictive. Also, directional terms stated herein such as top, bottom and beside are supposed to be relative. Thus, there is no limitation on the orientation of the system or its components.

FIG. 1 shows an example of duplicated channels in a periodic TWF.

FIG. 2 shows an example of recursive channels in a periodic TWF.

FIG. 3 shows an example of an assembly NG-PON2 ONU receiver.

FIG. 4 shows another example of an assembly NG-PON2 ONU receiver.

FIG. 5 shows one schematic example of a change in temperature of the TWF over time.

FIG. 6 shows a state machine example of the channel tuning events over a periodic TWF.

DESCRIPTION OF EMBODIMENTS

Even though a descriptive implementation of one or more embodiment instances is provided herein, the disclosed schemes and/or approaches of the present invention may be embodied in other specific forms without deviating from its fundamental features. Consequently, the disclosed embodiments should by no means be limited to the descriptive designs, drawings, implementations and techniques explained herein as they just depict typical embodiments of the invention.

FIG. 1 is a schematic illustration of an example of duplicated channels in the periodic TWF over an operating temperature range, where four channels are considered. Therefore, to select an appropriate channel from the four channels, a TWF is used at the receiver side of the NG PON2 ONU. And to select a channel out of the ones transmitted from the OLT to the ONU, i.e. the DS direction, a temperature controlled TWF may be used. The temperature of the TWF is set to that of the required channel (e.g. T1, T2, T3, T4).

For the periodic TWF, a major issue is that the channels may be repeated to infinity. Subsequently, the channels are normally recursive and are being repeated in channel cycles as depicted in FIG. 2. Lower cycles correspond to lower temperatures. As an example, partitions of the TWF of FIG. 2 may be:

Cycle 0: 20-50° C.;
Cycle 1: 60-90° C.;
Cycle 2: 100-130° C.;
Cycle 3: 140-170° C.;
Cycle 4: 180-210° C.

The arrangement in FIG. 3 shows an example of an assembly NG-PON2 ONU receiver with an integrated TWF (1). The embodiment further comprises:

A first thermal actuator, in this case a TEC (2);
A second thermal actuator, in this case a heater (3);
A temperature sensor, in this case a thermistor (4);
A sensor, in this case an optical power sensor (9).

And in this embodiment the controller (5) is to control the TEC (2) and heater (3) towards to define the temperature of the TWF (1) within the desired operating ranges.

The thermistor (4) is used to measure the global temperature of the device. And in an embodiment, the temperature of the TWF (1) may be measured indirectly through the received optical power using an optical power sensor (9). However, in another embodiment, a fast reading temperature sensor could be used to determine directly the temperature of the TWF (1).

The controller (5) may receive a channel signal from a user indicating the channel to be configured on the receiver. This channel signal may be a signal configurable by a user such as an electric signal, a switch or a reading from a memory. And in view of this signal, and also based on the feedback signals from the thermistor (4) and the optical power sensor (9), the controller (5) determines the driving signals (6, 7) to be sent to both thermal actuators, i.e. to the TEC (2) and heater (3).

The TEC (2) is used to define the global temperature of the device to a reference temperature. Based on the feedback voltage (8) of the thermistor (4), the controller (5) offers a driving signal (6) to the TEC (2) to maintain the device to a reference temperature.

Furthermore, the heater (3) is thermally coupled to the TWF (1) and is employed to maintain the temperature of the TWF (1) at a determined temperature, which must be different from the reference temperature of the device defined by the TEC (2). The TEC (2) is coupled to the TWF (1) by a second thermal coupling and it may be heated or cooled as determined by the controller (5).

If the heater (3) power changes, the temperature of the TWF (1) will change accordingly. Therefore, removing the heater (3) power, the temperature of the TWF (1) tends to a temperature which is defined by the first thermal actuator, i.e. the TEC (2).

The operation using at least two thermal actuators allowing effective management of the temperature of the TWF (1) over a wide range of operating temperatures, enabling fast cooling and heating and, consequently, fast wavelength channel tuning. It should be noted that, heat can be applied to the TWF (1) at any stage of operation for rapid change in its temperature. Consequently, the amount of applied heat may be increased or reduced during operation.

FIG. 5 is a schematic of an example of a change in temperature of a TWF over time. It should be noted that the temperature increases rapidly (high heat transfer rate) at high temperatures and then increases more slowly (low heat transfer rate) for low temperatures. This is the conventional way of heat exchange. The major changes in temperature happen when the differences in temperature are at the extremes. This is in accordance with the Newton's law of cooling that states that when there is a big temperature difference, heat flows rapidly and also make the temperature to change quickly, as reported by Patrick C. Gibbons in "Physics", Barron's Educational Series, 1992. However, when there is a small temperature difference, heat flows slowly and also the temperature changes gradually.

Therefore, the concept of fast wavelength channel tuning of the receiver example of FIG. 3 is the following: the TEC (2) is set to a reference temperature, while the TWF (1) is defined to a higher temperature by the heater (3). Consequently, the present invention may operate from high temperatures to lower ones to achieve Class 2 device requirements in tuning from higher to lower channels. For instance, in order to achieve a tuning time that is compatible with Class 2 mode, the TWF (1) may be operated in the Cycle 3 temperature range (FIG. 2), and the temperature reference of the device, which is established by the TEC (2), fixed within the Cycle 0 temperature range (FIG. 2), for instance. If the heater (3) power is turned off, the system tends to drop to the reference temperature provided by the TEC (2). Thus, other subsequent channels can be rapidly tuned by such a drop in the temperature of the TWF (1) caused by the reducing of the temperature provided by the heater (3) in addition to the cooling effect caused by the TEC (2).

The temperature controlling method herein disclosed for tuning from lower to higher wavelength channels is that, instead of removing the power from the heater (3), the present invention may increase the power in the heater (3). This helps in ensuring very fast heating. As an example, the heater (3) may increase the temperature of the TWF (1) two or three cycles above to the normal operation of the filter (considered as the Cycle 3 in this example), which results in rapidly heating and tuning of the channel.

In general, the heater (3) and the use of a TWF (1) that operates at higher temperature, while keeping the TEC (2) at a lower reference temperature, helps in both rapid cooling and heating of the system in order to achieve fast wavelength channel tuning time.

For the system calibration, two main calibration parameters are required for the controller (5): the temperature reference at which the TEC (2) will keep the device, and the average heater (3) driving signal (7) for each wavelength channel so that the TWF (1) will be operating at the Cycle 3, for instance.

However, other challenges need to be addressed with this technology. For example, in telecommunications the environmental temperature of the receiver case may be subjected to changes of more than 100° C. while the receiver must maintain its operation, which may cause a shift of the center wavelength channel location of the TWF (1). As an example, the feedback voltage (8) of the thermistor (4) may not represent the exact reference temperature of the device. This can affect receiver sensitivity since the bandwidth of the employed TWF (1) is generally narrow (e.g. <20 GHz).

Another factor that can cause signal loss is the slight wavelength shift of the OLT, resulting in a shift of the received wavelength channel at the ONU receiver.

Therefore, to keep the TWF (1) always at the center of the wavelength channel, the feedback optical power associated to the received signal may be employed. In the schematic of FIG. 3 this is accomplished by an optical power sensor (9), with a received signal strength indicator (RSSI) (10) to the controller (5).

The RSSI (10) acts as a feedback to the controller (5) to determine the received signal optical power level. The concept behind is that at the center of the channel the RSSI (10) is higher. This helps in keeping the TWF (1) at the center of the channel. Therefore, the driving signal (7) of the heater (3) takes into account the RSSI (10) optimization towards keeping the TWF (1) always tuned at the center of the received wavelength channel. The TEC (2) may be always maintained at a fixed reference temperature.

However, this solution brings the challenge in how to control the heater (3) when there is no received optical signal from the OLT, i.e. when the OLT channel is removed. Without the received wavelength channel, the heater (3) controller is blind, since it takes into account the RSSI (10) optical power optimization, and therefore it can shift to another wavelength channel, resulting in channel mapping mismatch. This is associated with the fact that the scheme may not distinguish the channel number only from the RSSI (10) feedback.

To mitigate this issue of the schematic of FIG. 3, in addition to the temperature reference provided by the TEC (2), as well as the heater (3) driving signal (7) for each wavelength channel, other fix calibration parameters such as the channel spacing of the TWF (1) in temperature may be obtained from the manufacturer's calibration. A fast calibration may be also required in each boot up of the NG-PON2 ONU receiver to obtain other parameters that are nonlinear and depend, for instance, on the case temperature of the device. As an example, the boot up calibration can disable the TEC (2) and the heater (3) by seconds in the initialization and the measured thermistor (4) value can give a feedback for the temperature of the TWF (1), which is controlled by the heater (3). And if the OLT channel is removed during the normal operation, the system can return for the boot up calibration until the OLT channel returns.

To deal effectively with this issue of channel mapping mismatch when there is no optical signal from the OLT, the design of FIG. 3 can be improved. The example design provided by FIG. 4 comprises two additional feedback inputs for the controller (5). One of the inputs is the feedback sampling of the heater power (11), which is used to manage the temperature of the TWF (1). This feedback is used because the driving signal (7) applied to the heater (3) by the controller (5) may not keep the power of the heater (3) constant, depending for instance on the device case temperature (which depends also on the environment temperature).

Therefore, in order to enable the full temperature range operation of the device, and keeping the TWF (1) substantially at the center of the received wavelength channel, in the schematic of FIG. 4 the feedback sampling of the heater power (11) is maintained constant by the controller (5). This means that the driving signal (7) for the heater (3) may vary, depending on the feedback sampling of heater power (11). In addition, the reference temperature of the device provided by the TEC (2) may be linearly adjusted slightly to compensate the device case temperature, being this adjustment factor calibrated in the manufacturing, for instance. And the device case temperature may be given by an additional temperature sensor (12) that may be located next to the case, which is another additional feedback input signal (13) for the controller (5). Therefore, with this slight linear adjustment of the reference temperature provided by the TEC (2), if the feedback sampling of the heater power (11) is maintained constant by the controller (5), the TWF (1) will be almost tuned to the same wavelength indefinitely as the case may be.

In summary for the schematic of FIG. 4, when there is no optical received signal (i.e. without OLT channel), the controller (5) drives the second thermal actuator, in this case a heater (3), by keeping constant the feedback sampling of the heater power (11) applied to this second thermal actuator. And the controller (5) keeps the TWF (1) always in same wavelength for the full temperature range operation of the device by applying a compensation factor to the reference temperature established by the first thermal actuator, in this case a TEC (2). In the case when there is optical signal from the OLT, the control mechanism of the heater (3) changes to the RSSI (10) feedback optimization.

Therefore, the integration of both controls to the heater (3) makes the TWF (1) control easier and feasible. The heater (3) power based control scheme offers feedback about approximate location of the received wavelength channel while the RSSI (10)-based control scheme helps in fixing and fine-tuning the TWF (1) on the exact center wavelength channel. Consequently, with implementation of both schemes in this invention, there is no need for a boot up calibration as there may be needed in the schematic of FIG. 3. Furthermore, the calibration of the receiver is fully performed in the manufacturer's calibration.

The concept of fast wavelength channel tuning may be maintained the same. The power of the second thermal actuator, in this case a heater (3), is disabled or strongly decreased during a channel tuning event, so that the TWF (1) quickly reach a lower wavelength channel in order to achieve a fast tuning time. In an opposite mode of operation, the heater (3) power is strongly increased during a channel tuning event in order to the TWF (1) quickly reach a higher wavelength channel in order to achieve a fast tuning time.

Furthermore, using a periodically TWF as the one depicted in FIG. 2, the tuning time of this technology can be further optimized. Operating with the TWF in the Cycle 3 temperature range operation, for instance, channels 1 to 4 corresponds to the T13 to T16 temperatures. Therefore, the longer wavelength tuning distance in temperature (in the case between channel 1 and 4, or between channel 4 and 1) will determine the worst tuning time of the technology. Since the TWF is repeated to infinity, and therefore each one of the four DS wavelengths of the NG-PON2 are also infinitely repeated, the tuning time between the longer tuning distances in temperature can be optimized by additionally using both Cycle 2 and 4. If the TWF is operating at the T16 temperature (channel 4), and a tuning event for channel 1 is requested, instead of tuning for the T13 temperature, the TWF can be defined to the T17 temperature, and consequently also be tuned for channel 1 with a faster tuning time. Similarly, if the system is operating at the T13 temperature (channel 1) and a tuning event for channel 4 is requested, the TWF can be tuned for the T12 temperature. Obviously, this strategy cannot be repeated endlessly and must be interrupted in a determined temperature under penalty of operating too far from Cycle 3, and no longer obtaining the tuning times of the ones obtained in the Cycle 3 (the cycle used as example). An example of the tuning event state machine for the device is depicted in FIG. 6.

It should be understood that the discussed NG-PON2 ONU receiver wavelength-tunable optics is in no way limits the concept to certain classes or types of devices. Also, it should be understood that the present invention and more specifically its claims, are intended to cover all of the generic and certain features of this tunable optical receiver.

The invention claimed is:

1. A temperature tunable optical receiver comprising:
a temperature tunable wavelength filter (1) to select a specific received optical wavelength channel;
at least two thermal actuators thermally coupled to the tunable wavelength filter (1), characterized by comprising at least a first thermal actuator (2) and a second thermal actuator (3); wherein the first thermal actuator (2) is configured to maintain the temperature of the tunable optical receiver within a first defined temperature range; wherein the second thermal actuator (3) is configured to maintain the temperature of the tunable wavelength filter (1) at a second defined temperature range; wherein the temperature of the tunable wavelength filter (1), defined by the second thermal actuator (3), is different from the reference temperature of the tunable optical receiver defined by the first thermal actuator (2);
at least a temperature sensor (4), which is configured to issue a sensing signal associated to the global temperature of the tunable optical receiver;
at least an optical power sensor (9), which is configured to issue a sensing signal associated to the temperature of the tunable wavelength filter (1);
a controller (5) electrically coupled to the first thermal actuator (2), to the second thermal actuator (3), to the temperature sensor (4), and to the optical power sensor (9), being the controller (5) configured to receive a wavelength channel signal by controlling the temperature of the tunable wavelength filter (1) issuing a first driving signal (6) to the first thermal actuator (2) and a second driving signal (7) to the second thermal actuator (3), in view of the feedback sensing signals from the optical power sensor (9), from the temperature sensor (4), and from a sampling of the power of the second thermal actuator (11); wherein the sampling of power of the second thermal actuator (11) is maintained constant by the controller (5).

2. The temperature tunable optical receiver of the claim 1, characterized by the optical power sensor (9) is configured to provide a received signal strength indicator (10) to the controller (5).

3. The temperature tunable optical receiver of claim 1, characterized by the temperature sensor (4) is a thermistor with a feedback voltage (8) to the controller (5).

4. The temperature tunable optical receiver of claim 1, characterized by the first thermal actuator (2) is a TEC device.

5. The temperature tunable optical receiver of claim 1, characterized by the second thermal actuator (3) is a heater device.

6. The temperature tunable optical receiver of claim 1, characterized by comprising an additional temperature sensor (12), located next to a case of the optical receiver, which is configured to provide an additional feedback input signal (13) for the controller (5) to help in the driving of the first thermal actuator (2) and second thermal actuator (3) across the entire operating temperature range of the tunable optical receiver.

7. A method of temperature tuning in tunable optical receivers characterized by using the temperature tunable optical receiver of claim 1 and by comprising the following steps:
the first thermal actuator (2) maintains the temperature of the tunable optical receiver within a first defined temperature range;
the second thermal actuator (3) maintains the temperature of the tunable wavelength filter (1) at a second defined temperature range; wherein the temperature of the tunable wavelength filter (1), defined by the second thermal actuator (3), is different from the reference temperature of the tunable optical receiver defined by the first thermal actuator (2);
the temperature sensor (4) issues a sensing signal associated to the global temperature of the tunable optical receiver;
the optical power sensor (9) issues a sensing signal associated to the temperature of the tunable wavelength filter (1);
the controller (5) configured to receive a wavelength channel signal by controlling the temperature of the tunable wavelength filter (1); and
the controller (5) issues a first driving signal (6) to the first thermal actuator (2) and a second driving signal (7) to the second thermal actuator (3), in view of the feedback sensing signals from a sampling of power of the second thermal actuator (11), from the optical power sensor (9) and from the temperature sensor (4).

8. The method of temperature tuning in tunable optical receivers of the claim 7 wherein the second temperature is different from the first temperature according to the target wavelength tuning time.

9. The method of temperature tuning in tunable optical receivers of claim 7 wherein the power of the second thermal actuator (3) is decreased or increased according to the current and next wavelength during a channel tuning event.

10. The method of temperature tuning in tunable optical receivers of claim 7 wherein the controller (5) issues a driving signal (7) to the second thermal actuator (3) by keeping constant the power associated to the second thermal actuator (3), in view of the feedback sampling of the power of the second thermal actuator (11).

11. The method of temperature tuning in tunable optical receivers of claim 7, wherein, when optical power is not present at the receiver, the controller (5) issues a driving signal (7) to the second thermal actuator (3) by keeping constant the power associated to the second thermal actuator (3) in view of the feedback sampling of the power of the second thermal actuator (11), helping to maintain the tunable wavelength filter (1) substantially at the center of the received wavelength channel.

12. The method of temperature tuning in tunable optical receivers claim 7, wherein the optical power sensor (9) provides a received signal strength indicator (10) to the controller (5).

13. The method of temperature tuning in tunable optical receivers of claim 12 wherein the optical power sensor (9) monitors the received optical power providing a received signal strength indicator (10) to the controller (5), being a reference for the temperature of tunable wavelength filter (1) by indicating whether the filter is centered on the received channel.

14. The method of temperature tuning in tunable optical receivers claim 12, wherein, when optical power is present at the receiver, the controller (5) issues a driving signal (7) to the second thermal actuator (3) based on the feedback of a received signal strength indicator (10) given by the optical power sensor (9) in order to keep the tunable wavelength filter (1) always tuned at the center of the received wavelength channel.

15. The method of temperature tuning in tunable optical receivers of claim 7 wherein the controller (5) includes a state machine managing accordingly the sequence of the channel tuning events towards to achieve shorter and faster tuning channels sequences, by considering the possible infinite periodicity of the tunable wavelength filter (1) and the knowledge of current and next wavelength channel.

16. The method of temperature tuning in tunable optical receivers of claim 7 wherein the temperature of the tunable wavelength filter (1), defined by the second thermal actuator (3), is higher than the reference temperature of the tunable optical receiver defined by the first thermal actuator (2).

17. The method of temperature tuning in tunable optical receivers of claim 7 wherein the temperature sensor (4) is a thermistor with a feedback voltage (8) to the controller (5).

18. The method of temperature tuning in tunable optical receivers of claim 7 characterized by comprising an additional temperature sensor (12), located next to a case of the optical receiver, which provides an additional feedback input signal (13) for the controller (5) to help in the driving of the first thermal actuator (2) and second thermal actuator (3) across the entire operating temperature range of the tunable optical receiver.

* * * * *